UNITED STATES PATENT OFFICE.

WILHELM LOMMEL, OF ELBERFELD, GERMANY, ASSIGNOR TO FARBENFABRIKEN VORM. FRIEDR. BAYER & CO., OF ELBERFELD, GERMANY, A CORPORATION OF GERMANY.

LEUCO DERIVATIVE OF DIETHYLGALLOCYANIN.

961,361.  Specification of Letters Patent.  Patented June 14, 1910.

No Drawing.  Application filed February 19, 1910. Serial No. 544,869.

*To all whom it may concern:*

Be it known that I, WILHELM LOMMEL, doctor of philosophy, chemist, citizen of the German Empire, residing at Elberfeld, Germany, have invented new and useful Improvements in New Leuco Derivatives from Diethylgallocyanin, of which the following is a specification.

In United States Letters Patent 856536 a leuco derivative of a dyestuff of the oxazin series is described which is chemically decarboxylated leuco-gallocyanin derived from nitrosodimethylanilin and gallic acid. The gallocyanin derived from nitrosodiethylanilin and gallic acid is not particularly described and my experience is that by the process hitherto known for the production of these compounds it cannot be obtained in technical yields. I have found a process for its production which consists in using for the condensation salts of the nitroso compound of diethylanilin with such acids as form with the nitroso compound difficultly soluble salts.

I have now found that a new leuco derivative of a coloring matter of the oxazin series is produced from gallocyanin (obtained by the action of nitrosodiethylanilin on gallic acid) by splitting off from leuco-diethylgallocyanin the carboxylic group e. g. by heating it until a test portion after oxidation is soluble in hydrochloric acid of 20° Bé. with a pure blue color and is insoluble in sodium carbonate solution. These tests readily distinguish the new dye from leuco-diethylgallocyanin which after oxidation is soluble in sodium carbonate solution and dissolves in hydrochloric acid of 20° Bé. with a red color.

The following example will further illustrate my invention, the parts being by weight:—36.5 parts of the diethylgallocyanin dye (obtained by the action of nitrosodiethylanilin on gallic acid) are reduced with 9 parts of zinc dust and hydrochloric acid and the filtered solution is then heated for some hours to 95-100° C., care being taken to prevent the access of air as much as possible. The product of the reaction is tested from time to time and the reaction is complete when on repeated testing it is found that after the addition of sodium carbonate and oxidation of the precipitated leuco compound by air the dyestuff is insoluble in a sodium carbonate solution and soluble in hydrochloric acid of 20° Bé. with a pure blue color. When this point is reached the product of the reaction is precipitated by the addition of common salt.

The hydrochlorid of the new leuco compound forms after drying and powdering a dark powder easily soluble in water with a yellowish-brown color. On adding sodium acetate or sodium carbonate to the aqueous solution of the hydrochloric acid salt the free base separates out which oxidizes very rapidly on exposure to air. The new leuco compound dissolves in concentrated sulfuric acid with a reddish-yellow color. It yields upon oxidation the color described in my other application for Letters Patent of same date from which it can be produced by reduction.

I claim:

The herein-described new leuco compound being chemically decarboxylated leuco-diethylgallocyanin, which is in the shape of its hydrochlorid a dark powder which after oxidation is insoluble in sodium carbonate solution and dissolves in hydrochloric acid of 20° Bé. with a pure blue color and which new leuco compound is easily soluble in water with a yellowish-brown color, soon turning blue in consequence of oxidation; dissolving in concentrated sulfuric acid with a reddish-yellow color; the free base being separated by the addition of sodium carbonate to the aqueous solution of the hydrochlorid, substantially as hereinbefore described.

In testimony whereof I have hereunto set my hand in the presence of two subscribing witnesses.

WILHELM LOMMEL. [L. S.]

Witnesses:
 OTTO KÖNIG,
 WILLY KLEIN.